Feb. 8, 1927.
M. FLEISCHER
DEVICE FOR TEACHING DRAWING
Original Filed June 4, 1925
1,617,207
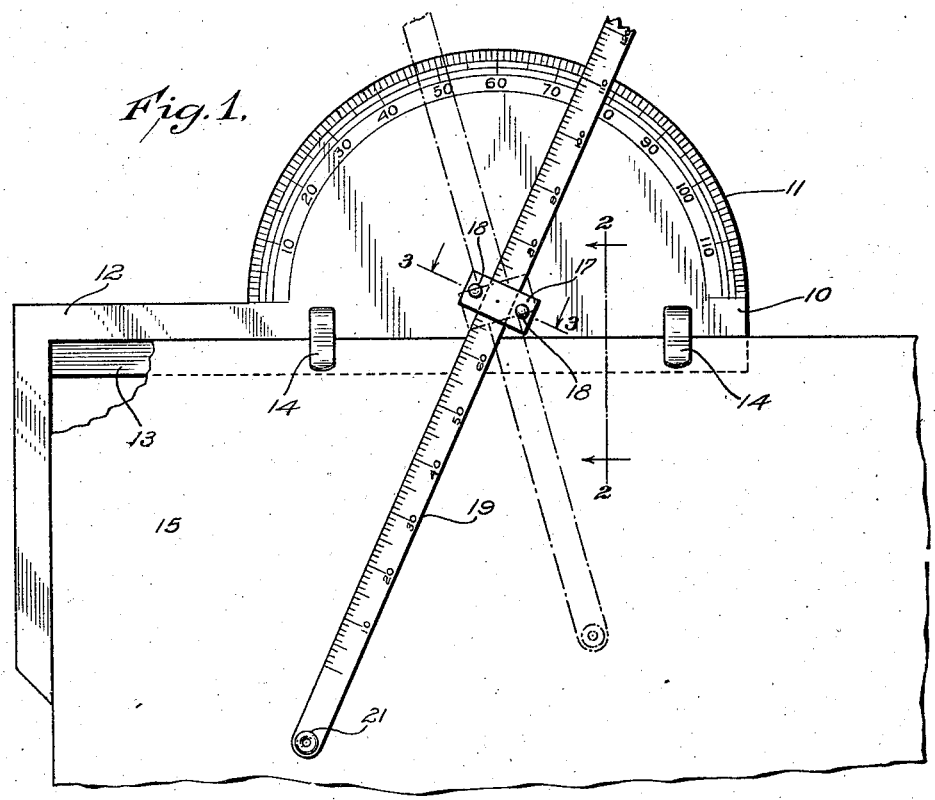
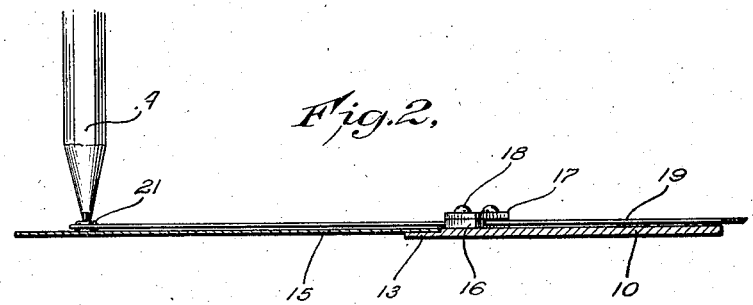
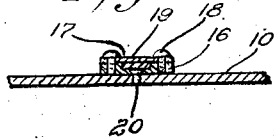
WITNESSES
INVENTOR
MAX FLEISCHER
BY
ATTORNEYS Patented Feb. 8, 1927.

1,617,207

UNITED STATES PATENT OFFICE.

MAX FLEISCHER, OF BROOKLYN, NEW YORK, ASSIGNOR TO OUT OF THE INKWELL FILMS, INC., OF NEW YORK, N. Y., A CORPORATION OF NEW YORK.

DEVICE FOR TEACHING DRAWING.

Application filed June 4, 1925, Serial No. 34,991. Renewed November 12, 1926.

My invention relates to means for use in giving instructions for the making of a drawing.

Particularly the invention has in mind instructions given by radio broadcasting or in a class room.

The general object of my invention is to provide an instrument to be placed in the hands of those receiving the instructions as, for example, listeners into radio broadcasting and which instrument will enable the listener to locate successive points on a sheet of drawing paper so as to be enabled to unfailingly draw a line in a given direction and of a given length as directed by the instructor.

The nature of the invention and its distinguishing features and advantages will clearly appear as the description proceeds.

Reference is to be had to the accompanying drawings forming a part of this specification, it being understood that the drawings are merely illustrative of one example of the invention.

Figure 1 is a plan view of a device embodying my invention;

Figure 2 is a transverse vertical section on the line 2—2, Figure 1;

Figure 3 is a section on the line 3—3, Figure 1.

In carrying out my invention in accordance with the illustrated example, a base plate 10 is provided having a curved scale 11. Appurtenant to the plate 10 and preferably integral therewith is a square 12 one arm of which is partly formed by the base of the plate 10 and continued at one end beyond said plate as at the left of Figure 1, and then at right angles in the form of a square as shown. Thus, the main arm of the square is formed partly by the base portion of the plate 10. The said main arm of the square 12 is riveted as at 13 so that the sheet of paper 15 may be positioned by the square along the base of the plate 10 and lie flush or approximately so with the face of said plate 10. Clips 14 are provided on the plate 10 or equivalent means to hold the paper in position.

Means is provided to hold a longitudinal scale and permit the same to be variously positioned relatively to the arcuate scale 11. The holding means for the elongated scale is here shown as consisting of a block 16 swivelled as by rivet 20 to the plate 10 so that said block may turn. Lying flush with the surface of the block 16 is an elongated scale 19 which is held slidably to said block 16 by a cap plate 17 suitably fastened as by screws 18. At the inner end the elongated scale 19 has a hole to receive the point of a pencil A, there being shown an eyelet 21 for the purpose.

In the use of my improved device the same is placed in the hands of scholars or listeners in to a drawing lesson given by radio broadcasting. Each user of the device places a sheet of paper 15 in position and it is held in position by clips 14 or the equivalent. Use is made of two sets of numbers to locate in succession given points on the paper 15. The graduations are successively numbered 10, 20, 30 etc., to 110 in the illustrated example on the arcuate scale 11. The numbers on the elongated scale 19 may run higher than those on the scale 11 and any suitable system of numbering may be employed. I have shown spaces between two numbers and divided into tenths. In the use of this device it is my practice to first call out a number on the scale 11, as for example 74, and then to call off a number on the elongated scale as for example 110. The user of the device now brings the number 110 on the scale 19 to the 74th sub-division on the scale 11. This adjustment of the device makes it possible for the eyelet 21 to receive a pencil point at a given point, on the paper 15. It is to be understood that the instructor has one of my devices before him when instructing and he brings the eyelet 21 over the point of his master drawing that he desires to locate. The pencil A having been used to indicate a point on the paper 15, two more numbers are called off, as for example 90 on the scale 11, and 90 on the scale 19. The scale 19 is then brought to position its number 90 at 90 on the scale 11 and the instructor now directs the listeners or other pupils to draw a line from the point first obtained to the point located secondly. In that way the listener or other scholar unfailingly succeeds in drawing a line between two given points as directed.

It will be readily understood that the described device has a wide range of use for the transmission by radio broadcasting of instructions for the making of various drawings and plans such as architectural drawings and war plans. The use of the device is not limited to the production of straight line drawings under the directions of the instructor since points can be located by instructions from a distance or by an unseen instructor or on a sheet of paper on which the proper combinations of numbers are already produced, but a series of points can be made in such a relation that curved lines can also be drawn, thereby making it possible for the user of the device to draw illustrations, imitate handwriting, etc., involving curved lines by following the instructions for locating successive points on the sheet on which the drawing or the like is to be produced so that a line drawn through a multiplicity of located points will be curved.

I would state furthermore that while the illustrated example constitutes a practical embodiment of my invention, I do not limit myself strictly to the exact details herein illustrated, since, manifestly, the same can be considerably varied without departure from the spirit of the invention as defined in the appended claim.

Having thus described my invention, I claim:

A device for teaching drawing, comprising a plate having a base portion and an arcuate scale, a square integral with said plate and having its main arm formed partly by the base portion of said plate, said main arm and the base being rabbeted to receive a sheet of paper below the plane of the base portion and arm, means on said plate at the base thereof to hold said paper in position, an element swivelled to said plate concentric to said scale, and an elongated scale held to said element to slide therein and to turn therewith for causing an end of the said elongated scale to move over the said paper, said arcuate scale and said elongated scale having series of symbols adapted to variously position the same to dispose a number of one series adjacent to a number of the other series for locating an end of the elongated scale at a given point on said paper, said elongated scale having, in that end thereof movable over the paper, a hole to receive a marking point.

MAX FLEISCHER.